US007334757B2

(12) United States Patent
Steinkerchner et al.

(10) Patent No.: US 7,334,757 B2
(45) Date of Patent: Feb. 26, 2008

(54) AIRSHIP RETRIEVAL SYSTEM

(75) Inventors: Brian W. Steinkerchner, Wadsworth, OH (US); Thomas L. Marimon, Silver Lake, OH (US); Dennis L. Carter, Hudson, OH (US); Gordon S. Schmidt, North Canton, OH (US); Anthony L. Dunne, Hudson, OH (US)

(73) Assignee: Lockheed Martin Corp., Akron, OH (US)

( * ) Notice: Subject to any disclaimer, the term of this patent is extended or adjusted under 35 U.S.C. 154(b) by 186 days.

(21) Appl. No.: 11/244,448

(22) Filed: Oct. 6, 2005

(65) Prior Publication Data

US 2007/0246602 A1  Oct. 25, 2007

(51) Int. Cl.
*B64F 1/12* (2006.01)
(52) U.S. Cl. .................................................... 244/115
(58) Field of Classification Search ............... 244/115, 244/24–33, 125–128
See application file for complete search history.

(56) References Cited

U.S. PATENT DOCUMENTS

| 2,783,002 | A | * | 2/1957 | Ney et al. ..................... 244/31 |
| 3,176,935 | A | * | 4/1965 | White et al. .................. 244/31 |
| 4,842,219 | A | * | 6/1989 | Jakubowski et al. .......... 244/31 |
| 6,010,093 | A | * | 1/2000 | Paulson ........................ 244/24 |
| 6,231,007 | B1 | * | 5/2001 | Schafer ....................... 244/127 |
| 2005/0103930 | A1 | * | 5/2005 | Silansky et al. .............. 244/30 |

OTHER PUBLICATIONS

American Institute Of Aeronautics and Astronautics; Christoforato, Simon and Ashford, Robert L., "A New Airship Ground Handling System that Works," pp. 134-143; 1997 (publication is sufficiently earlier than the effective U.S. filing date so that the month of publication is not in issue).

* cited by examiner

*Primary Examiner*—Tien Dinh
(74) *Attorney, Agent, or Firm*—Renner Kenner Greive Bobak Taylor & Weber

(57) ABSTRACT

An airship retrieval system comprises a plurality of aerodynamic pods releasably mounted in suitable locations about the external surface of the airship. Within the pod is a handling or a tether line that is attached at one end to the airship and at the other end to the pod. When a suitable control signal is sent to the pod, the pod is released and the handling line and pod falls toward the ground to enable retrieval of the airship.

15 Claims, 5 Drawing Sheets

AIRSHIP RETRIEVAL SYSTEM

TECHNICAL FIELD

Generally, the present invention relates to an airship retrieval system to capture an airship from flight. More specifically, the present invention relates to an airship retrieval system that utilizes a plurality of aerodynamic pods to store and release handling lines to capture an airship from flight.

BACKGROUND

An exemplary prior art airship retrieval system is generally designated by the numeral 10 as shown in FIG. 1. As used herein, the term airship refers to any airship, aerostat, dirigible, or other lighter-than-air vehicle. Most conventional airship retrieval systems 10 comprise a plurality of battens 12 and a nose dish 13 attached to the nose of the airship 14. A nose line 15 is attached to the nose dish 13. The nose line 15 is most always deployed—even in flight—and is used by ground crews to maneuver the airship during take-offs and landings. In addition, the conventional retrieval system 10 utilizes a ground-based mooring mast that anchors the airship to the ground at the nose while allowing it to pivot to align itself to the wind. In addition, a number of handling lines 18, are attached to the airship at various points, and which remain attached during flight. Landing gear 20 may also be provided to allow the airship 14 to land and to be maneuvered and align with the wind while on the ground. Thus, when used together, the nose line 15, the handling lines 18, and the landing gear 20 allow the airship 14 to be captured once a flight has been completed. The lines and gear may also be used to initially guide the ship during take-off.

However, the battens 12 and the nose dish 13 that are permanently attached to the nose of the airship extend outwardly from the surface of the hull or envelope, thus creating a discontinuous or uneven surface that generates additional air drag while the airship 14 is in flight. Further, because the nose line 15 and handling lines 18 freely drag along the outside of the airship 14 during flight, additional drag and turbulence is generated. Moreover, the landing gear 20 and its extension away from the outer surface of the airship 14 also contribute significantly to air drag during flight.

Because the increase in air drag due to the nose line, handling lines, and battens is not a significant concern for a conventional airship, the use of attached nose lines 15, handling lines 18, and battens 12 are deemed effective. However, for airships utilizing a low-drag envelope, such as a high altitude airship, the nose line 15, the handling lines 18, the battens 12, and the nose dish 13 would create unwanted air disturbances in the laminar air stream that passes over the surface of the envelope. In addition, the weight of the handling lines, landing gear, battens, and nose dish are carried by the airship while it is in flight.

Therefore, there is a need for a retrieval system for a high altitude airship that does not utilize landing gear, battens, or a nose dish that are attached to the hull of the airship. Additionally, there is a need for a retrieval system for an airship that increases the speed, efficiency, and lift of the airship by eliminating the battens, the nose dish, and constantly deployed handling lines and nose line.

SUMMARY OF THE INVENTION

In light of the foregoing, it is a first aspect of the present invention to provide an airship retrieval system.

It is another aspect of the present invention to provide a retrieval system comprising an airship having an outer surface, at least one pod releasably coupled to the outer surface, the pod containing a line having a first end attached to the airship, and a second end attached to the pod, whereby upon detachment of the pod from the outer surface, the line falls from the airship.

Still another aspect of the present invention is to provide a retrieval system for an airship comprising a deployment bracket having a control line which receives a control signal, the deployment bracket adapted to be coupled to the airship, and a deployment canister releasably attached to the deployment bracket, the deployment canister containing a handling line having one end attached to the deployment canister, and a second end attached to said airship, wherein the deployment bracket releases the deployment canister upon receipt of the control signal.

Yet another aspect of the present invention is a method for retrieving an airship comprising providing an airship having at least one pod releasably coupled to the airship, the pod containing a line having one end attached to the airship and a second end attached to the pod, moving the airship to a desired altitude, releasing the pod from the airship at the desired altitude, wherein the second end of the line extends to a retrievable position.

It is still another aspect of the present invention to provide a retrieval system comprising an airship having an outer surface, at least one pod releasably coupled to the outer surface, the pod containing a line having a first end attached to the airship, and a second end attached to the pod, whereby upon detachment of the pod from the outer surface, the line falls from the airship, at least one tether pod releasably coupled to the outer surface, the tether pod containing a tether line having a first end, and a second end, the second end attached to the tether pod, and a plurality of flying lines having a first end attached to the airship, and a second end attached at a confluence point to the first end of the tether line, whereby upon detachment of the tether pod from the outer surface, the tether line falls from the airship.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1A:
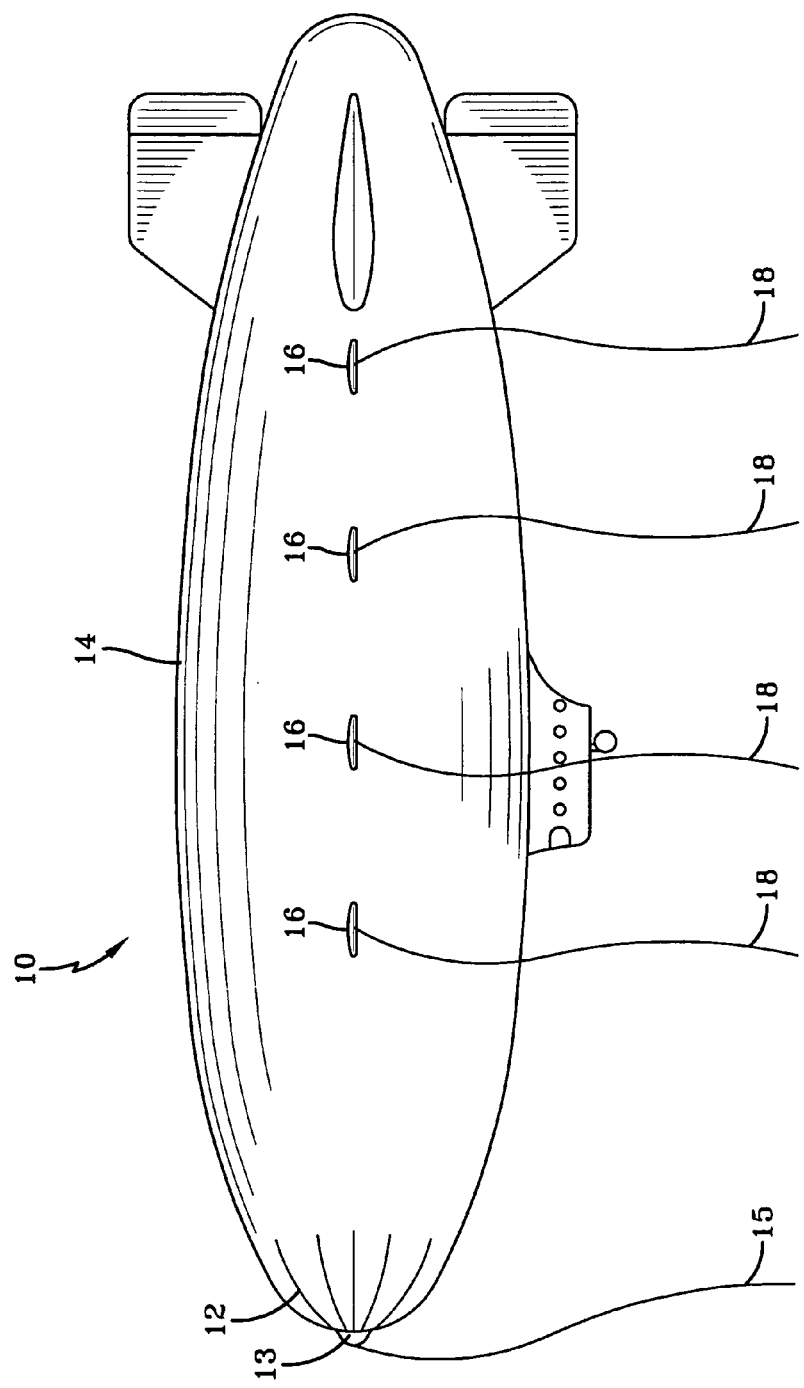
FIG. 1 is an elevational view of an airship using a prior art retrieval system.
Figure 2:
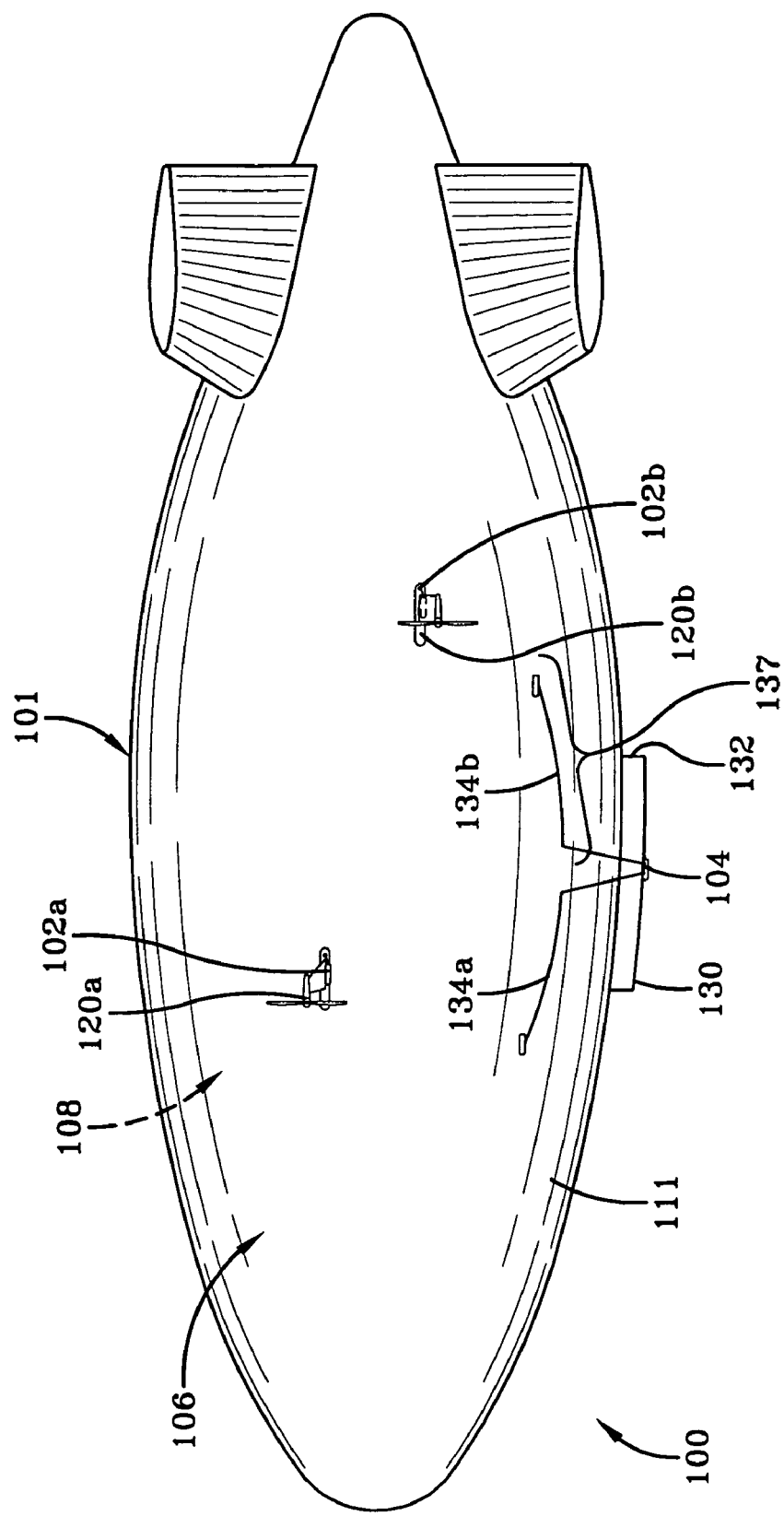
FIG. 2 is an elevational view of an airship using a retrieval system in accordance with the concepts of the present invention.

The retrieval system according to the concepts of the present invention is generally referred to by the numeral 100, as shown in FIG. 2 of the drawings. Although the system 10 is shown for use with a non-rigid pressurized airship, it will be appreciated that the system could also be used with rigid airships. In any event, the retrieval system 100 for an airship 101 comprises a plurality of handling line pods 102a-d (handling line pods 102c and 102d are on the other side not shown) and a tether pod 104. Other components associated with pods 102 have a similar alphabetic suffix. The handling line pods 102a-d and the tether pod 104 are releasably mounted about an outer surface of the airship and, in particular, a port side 106 and a starboard side 108 of the airship 101. Briefly, the airship 101 comprises an envelope 111 that is formed from a flexible laminate material made to withstand exposure to elements associated therewith. The envelope 111 contains a lighter-than-air gas, such as helium, that allows the airship to operate at the desired altitude. The envelope also contains an amount of air maintained separately from the lighter-than-air gas. The contents of the envelope are pressurized so as to maintain the structure of the airship. The envelope 111 may be internally supported by various types of support structures or chambers utilizing a material similar to that of the envelope 111 material or other structural materials.

The handling line pods 102a-d are aerodynamically contoured to reduce air drag and turbulence as the airship 101 is in flight. It should be appreciated that the handling line pods 102a-d and various tether pods to be discussed later may be attached anywhere on the airship 101 in any number of manners. As such, the manners of attachment discussed herein should not be construed as limiting. Within each handling line pod 102a-d is a corresponding handling line 112a-d (best seen in FIG. 3) wherein one end of each handling line 112a-d is attached to the airship 101 and/or the envelope 111, and a second, or opposite, end of the handling line 112a-d is attached to the individual pod 102a-d itself. It should be appreciated that the handling lines 112 a-d are of a suitable length to reach the ground when the airship 101 is at a predetermined altitude, and the handling line pods 102a-d are released. Furthermore, the handling lines 112 a-d may comprise rope, cable, or other suitable mooring line.

As shown in FIG. 2, the handling pods 102a and 102b may be placed on or may be integrated within or on respective propulsion units 120a and 120b of the airship 101.

Figure 3:
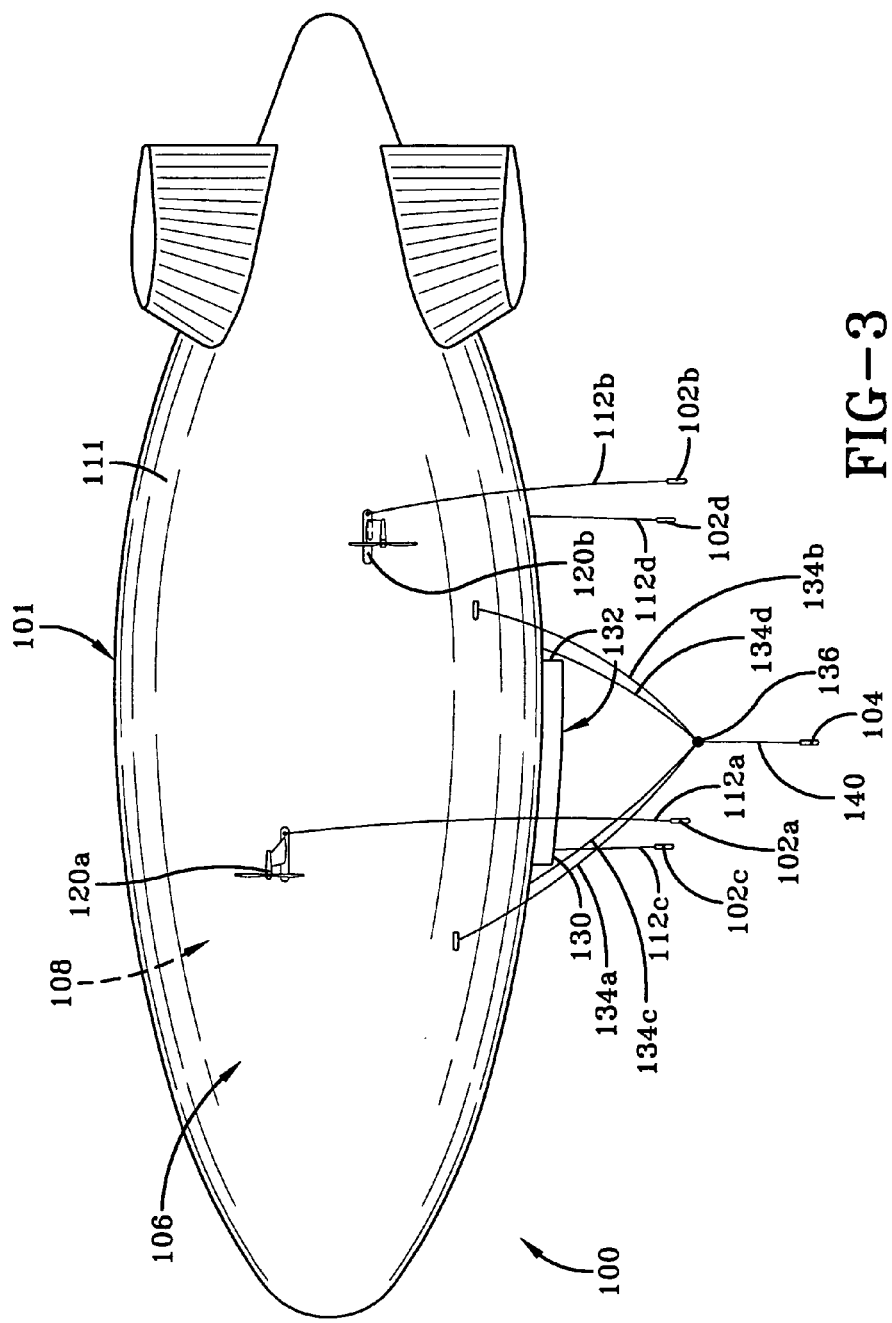
FIG. 3 is an elevational view of the retrieval system in which the handling line and tether pods have been released, to deploy the associated handling lines, flying lines, and tether line.

The airship 101 may carry a payload 132 which provides a bottom surface 130. The tether pod 104 is releasably mounted to the bottom surface 130 or the pod may be carried by cables attached to or wrapped around the envelope 111. The tether pod 104 is aerodynamically contoured to reduce air drag and turbulence as the airship 101 is in flight. Briefly, a plurality of flying lines 134a-d (which are not associated with the pods 102) are attached at a first end to the exterior of the envelope 111 at desired points. A second end of the flying lines 134a-d are attached at a confluence point 136 to a first end of a tether line 140, while the second end of the tether line 140 is attached to the tether pod 104 itself. Additionally, a first portion 137 of the flying lines 134a-d is releasably attached to the exterior surface of the envelope 111, while a second portion of the length (not shown) of the flying lines 134a-d is stowed within the tether pod 104. Thus, when the tether pod 104 is released, the weight of the tether pod 104, the weight of the tether line 140, or the load attached thereto causes the first portion 137 of each of the flying lines 134a-d to be released from the exterior surface of the envelope 111, as shown in FIG. 3, while the flying lines 134a-d remain attached at their first end to the envelope 111. It is contemplated that the first portion of the flying lines 134a-d may be releasably attached to the envelope 111 using loop and hook fasteners, breakaway ties, or any other releasable attachment means. Furthermore, it should be appreciated by those skilled in the art that the flying lines 134a-d and the tether line 140 are of a suitable length to reach the ground when the airship 101 is at or approaching a predetermined altitude and the tether pod 104 is released. One benefit of having the tether attached to the airship at a point aft of the nose is that the airship can fly at a nose-up angle while it is tethered. As a result, it generates aerodynamic lift that can be used to resist vertical gusts and drag that helps to stabilize it. Thus, when each of the handling line pods 102a-d and the tether pod 104 are released from the airship at the predetermined altitude, the handling lines 112a-d, flying lines 134a-d, and tether line 140 fall toward the ground in the orientation shown in FIG. 3. It should be appreciated that the handling line pods 102a-d and tether pod 104 may be releasably attached to the airship 101 at any desired location, and the above discussion should not be construed as limiting. In other words, the pods may be directly mounted on the airship and not directly associated with the propulsion units. It will be appreciated that the handling lines and the tether line may be of different lengths, although the tether line is ideally longer than all of the other handling lines.

Figure 4:
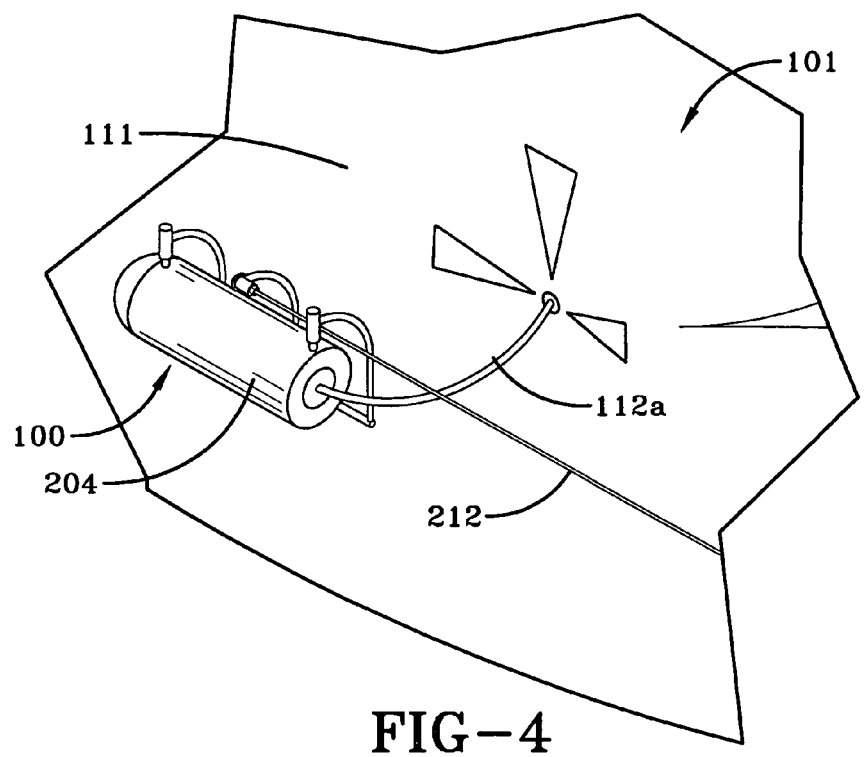
FIG. 4 is an elevational view of another embodiment of the present retrieval system that utilizes deployment canisters releasably mounted to deployment brackets.
Figure 5:
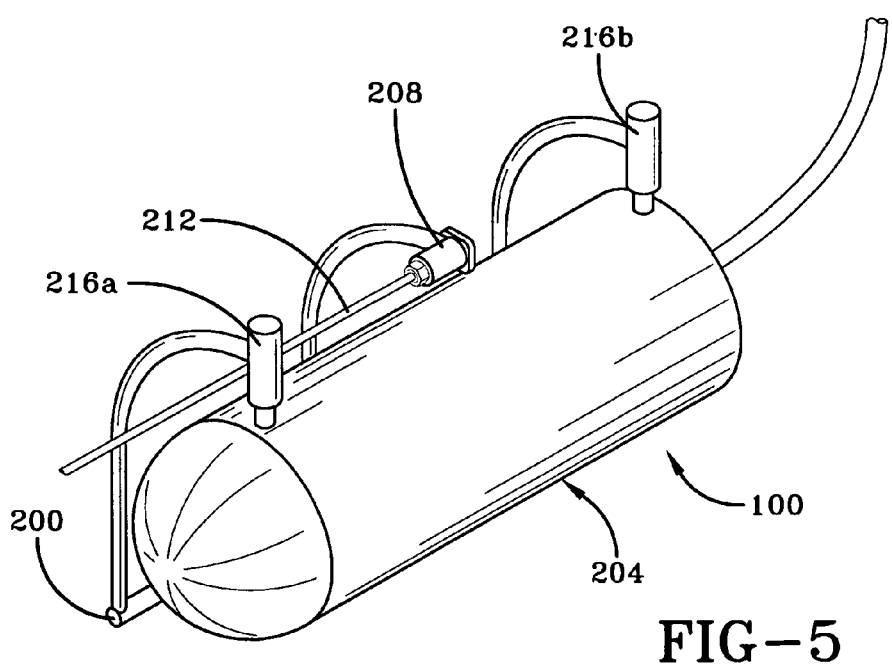
FIG. 5 is a perspective view of the deployment canister releasably mounted to the deployment bracket in accordance with an embodiment of the present invention shown in FIG. 4.

In another embodiment of the present retrieval system 100 shown in FIGS. 4 and 5, the handling line pods 102a-d may be releasably attached to a deployment bracket 200 that is directly attached to the outside of the envelope 111 by the use of load patches or other similar attachment mechanisms that distribute load forces appropriately. The handling line pods 102a-d may comprise a deployment canister 204. Non-explosive actuators may be carried by the canister and when actuated release the handling lines 112a-d contained therein. It will be appreciated that the deployment canister 204 may be aerodynamically shaped to reduce air drag when the airship 101 is in flight. Specifically, the deployment canisters 204 are releasably attached to the deployment bracket via a pin puller actuator 208. The pin puller actuator 208 is coupled to a control line 212 to disengage the canister 204 from the deployment bracket 200. The actuator releases a pair of springs 216a-b which eject the canister 204 from the deployment bracket 200. The pin puller actuator 208 is activated when a control signal is sent via a control line 212 causing the release of the canister 204. The control signal may be generated by a control system maintained within the payload or from a ground-based station or the like that controls the flight operations of the airship. The handling line 112a, shown in FIG. 4, is contained within the canister 204, where one end of the handling line 112a is attached to the envelope 111 via load patches which assist in distributing the tension forces generated by the lines into the envelope 101. The second end of the handling line is attached to the canister 204. Thus, when the deployment canister 204 is released, the handling line 112a is carried toward the ground by the weight of the canister 204.

Figure 6:
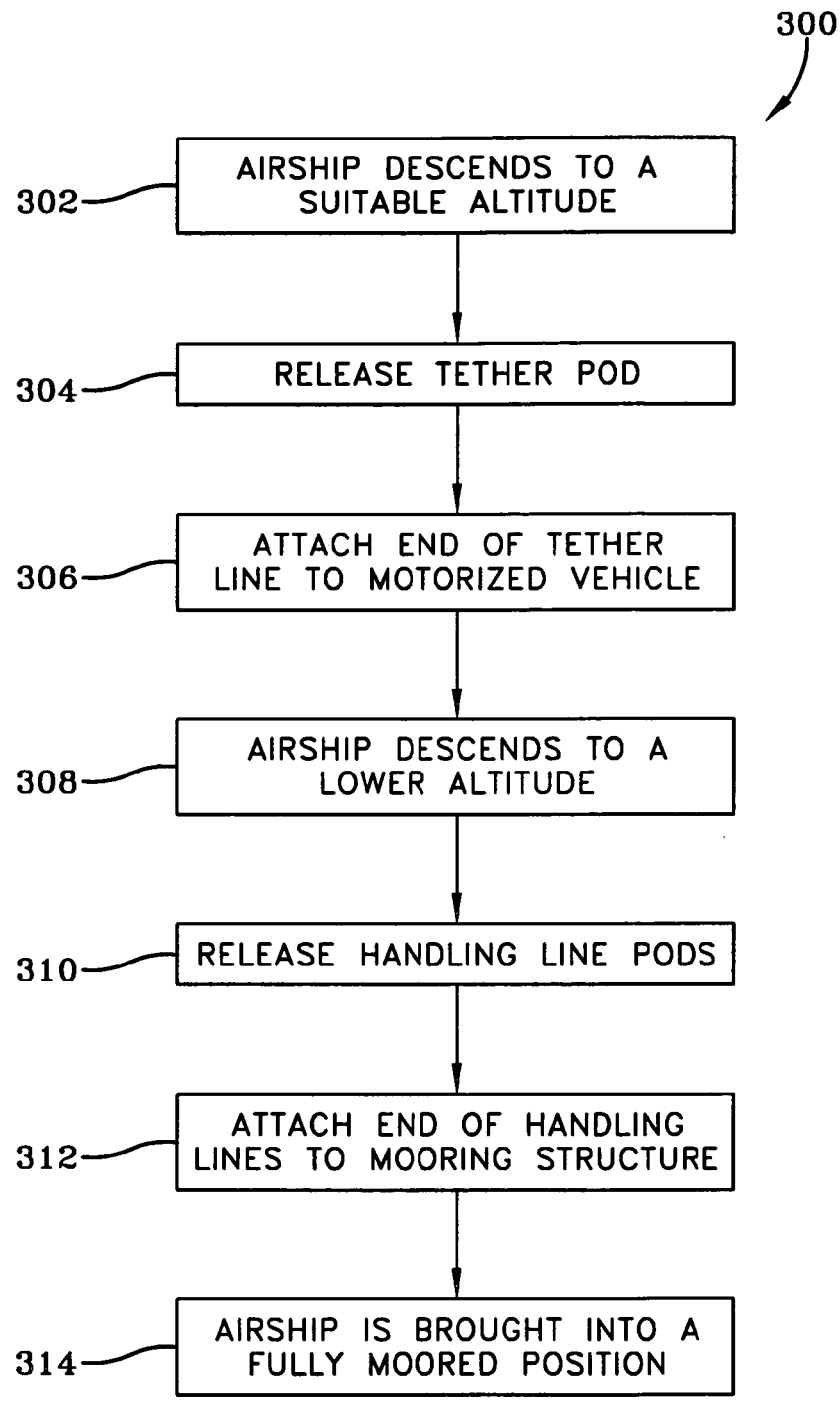
FIG. 6 is a flow chart showing the operational steps taken by the retrieval system in accordance with the concepts of the present invention, to bring an airship into a moored position.

The operational steps for utilizing the retrieval system 100 to bring the airship 101 into a moored position from altitude are generally indicated by the numeral 300, as shown in FIG. 6. At step 302, the airship 101 descends to an altitude that will allow the length of the tether line 140 to reach the ground when the tether pod 104 is released. In the case of a manned airship, the deployment of the tether and handling lines 140, 112a-d would be activated by the pilot. In an unmanned airship, deployment of the lines 140,112a-d may be actuated autonomously via a computer aboard the airship 101, such that the lines are released at a predetermined location. Moreover, the lines 140,112a-d of an unmanned airship may be deployed remotely from a ground station, or the like. Next, the tether pod 104 is released from the airship 101, causing it to fall toward the ground. As the tether pod 104 falls, the releasably attached first portion 137 of the flying lines 134a-d are released from the exterior surface of the envelope 111, as previously discussed, and as indicated at step 304. When the slack of the first portion 137 is consumed, the tether line 140 is carried to the ground, as indicated at step 304. At step 306, the tether line 140 is gathered by a ground crew, and is attached to a motorized vehicle suitably designed to tow the airship 101 to a desired destination.

After the airship 101 is towed to its intended destination, the process continues to step 308 wherein the airship 101 may descend or may be pulled down by the tether line 140 to a lower altitude, but this step is not required. Next, the process 300 continues to step 310 where the handling line pods 102a-d are released from the airship 101 and the respective handling lines 112a-d are dropped to the ground. After the handling line pods 102a-d have reached the ground, the handling lines 112a-d are gathered by the ground crew, and individually attached to a suitable mooring structure (not shown), as indicated at step 312. It will be appreciated that the handling lines may be released before or at the same time that the tether line is released. Finally, at step 314, the airship 101 is pulled down the remaining distance via the handling lines 112a-d, and into a docked or fully moored position. To achieve the moored or docked position, the mooring structure may contain a winch or other similar device to pull the lines in.

It should be appreciated that the airship 101 is flown to a suitably low altitude before deploying the tether and handling lines. This will provide sufficient slack in the ground handling lines 112a-d to allow the ground crew to attach them to the mooring structure. For example, the airship 101 may descend to 1000 ft. above the ground and then the flying lines 134a-d and tether line 140 are released by the tether pod 104. The tether line 140 may then be attached to the motorized vehicle that pulls the airship 101 by means of a winch to an altitude of approximately 250 ft. above the ground. Upon the airship 101 being approximately 250 ft. above the ground, the handling lines 112a-d may then be released, as discussed, and then attached to a suitable mooring structure. The mooring structure may contain a suitable winch or other mechanism to pull the airship 101 from the 250 ft. altitude to a fully moored or docked position.

It will, therefore, be appreciated that one advantage of the present invention is that an airship can be retrieved from altitude without the use of mooring masts, battens, nose dish, or landing gear. Yet another advantage of the present invention is that the airship used in association with the present invention has reduced weight. Still yet another advantage of the present invention is that the handling line and tether pods are aerodynamically shaped to reduce air drag and turbulence of the airship.

Although the present invention has been described in considerable detail with reference to certain embodiments, other embodiments are possible. Therefore, the spirit and scope of the appended claims should not be limited to the description of the embodiments contained herein.

What is claimed is:

1. A retrieval system comprising:
   an airship having an outer envelope surface;
   at least one pod releasably coupled to said outer envelope surface;
   a line having a first end attached to said outer envelope surface of said airship, and a second end attached to said pod, wherein upon detachment of said pod from said outer surface of said airship, said line is carried away from said airship by said pod; and
   at least one tether pod releasably coupled to said outer envelope surface, said tether pod containing a tether line having a first end attached to said airship, and a second end attached to said tether pod, whereby upon detachment of said tether pod from said outer envelope surface, said tether line falls from said airship.

2. The retrieval system according to claim 1, wherein said at least one pod and said tether pod are aerodynamically contoured.

3. The retrieval system according to claim 1, wherein said tether line is longer than said line.

4. The retrieval system according to claim 1, wherein said tether line is at least as long as said line.

5. A retrieval system comprising:
   an airship having a plurality of propulsion systems; and
   a plurality of handling line pods, wherein each of said handling line pods is releasably attached to a respective one of said propulsion systems, each of said plurality of handling line pods containing a handling line having a first end attached to said airship, and a second end attached to each said plurality of handling line pods, whereupon the release of said line pods results in said handling lines falling from said airship.

6. A retrieval system for an airship comprising:
   a deployment bracket having a control line which receives a control signal, said deployment bracket adapted to be coupled to the airship; and
   a deployment canister releasably attached to said deployment bracket, said deployment canister containing a handling line having one end attached to said deployment canister, and a second end attached to said airship, wherein said deployment bracket releases said deployment canister upon receipt of said control signal.

7. The retrieval system according to claim 6, wherein said deployment bracket comprises a pin puller actuator.

8. The retrieval system according to claim 6, further comprising one or more springs which eject said deployment canister from said deployment bracket.

9. A method for retrieving an airship comprising:
   providing an airship having an outer envelope surface, said airship having a plurality handling line pods releasably coupled to said outer envelope surface, said handling line pods each containing a handling line having one end attached to said airship and a second end attached to said respective handling line pod;
   moving said airship to a desired altitude;
   releasing said plurality of handling line pods from said outer envelope surface of said airship at the desired altitude, wherein said second end of each said handling line is carried and extends to a retrievable position by said pod.

10. The method according to claim 9, further comprising:
attaching said second end of said handling line to a motorized vehicle to tow the airship to a desired location.

11. The method according to claim 10, further comprising:
descending said airship to a second altitude.

12. The method according to claim 9, further comprising:
attaching said handling lines to a mooring structure to secure said airship.

13. A retrieval system comprising:
an airship having an outer surface;
at least one pod releasably coupled to said outer surface, said pod containing a line having a first end attached to said airship, and a second end attached to said pod, whereby upon detachment of said pod from said outer surface, said line falls from said airship;
at least one tether pod releasably coupled to said outer surface, said tether pod containing a tether line having a first end, and a second end, said second end attached to said tether pod; and
a plurality of flying lines having a first end attached to said airship, and a second end each attached at a confluence point to said first end of said tether line, whereby upon detachment of said tether pod from said outer surface, said tether line falls from said airship.

14. The retrieval system according to claim 13, wherein said plurality of flying lines comprise a first portion and a second portion, said first portion being releasably attached to said outer surface.

15. The retrieval system according to claim 14, wherein said second portion of said plurality of flying lines are stowed within said tether pod.

* * * * *